US009038330B2

(12) United States Patent
Bellavia

(10) Patent No.: US 9,038,330 B2
(45) Date of Patent: May 26, 2015

(54) LIGHT WEIGHT MOLDED ROOF TILE WITH INTEGRATED SOLAR CAPABILITIES

(71) Applicant: Carmen Bellavia, Pompano Beach, FL (US)

(72) Inventor: Carmen Bellavia, Pompano Beach, FL (US)

(*) Notice: Subject to any disclaimer, the term of this patent is extended or adjusted under 35 U.S.C. 154(b) by 0 days.

(21) Appl. No.: 14/222,057

(22) Filed: Mar. 21, 2014

(65) Prior Publication Data

US 2015/0089887 A1    Apr. 2, 2015

Related U.S. Application Data

(63) Continuation-in-part of application No. 13/458,277, filed on Apr. 27, 2012, now abandoned, which is a continuation-in-part of application No. 12/858,980, filed on Aug. 18, 2010, now abandoned.

(60) Provisional application No. 61/255,629, filed on Oct. 28, 2009.

(51) Int. Cl.
*E04D 13/18* (2014.01)
*E04D 1/22* (2006.01)
*E04B 1/94* (2006.01)
*E04D 1/28* (2006.01)
*H02S 20/25* (2014.01)
*E04H 14/00* (2006.01)
*E04D 1/34* (2006.01)

(52) U.S. Cl.
CPC . *E04D 1/22* (2013.01); *E04B 1/941* (2013.01); *E04D 1/28* (2013.01); *H02S 20/25* (2013.01); *E04D 2001/3435* (2013.01)

(58) Field of Classification Search
None
See application file for complete search history.

(56) References Cited

U.S. PATENT DOCUMENTS

| 2,362,236 | A | | 11/1944 | Bassler |
| 3,243,491 | A | | 3/1966 | Bethe |
| 3,774,428 | A | * | 11/1973 | Derry et al. ................ 72/46 |
| 3,852,934 | A | * | 12/1974 | Kirkhuff .................... 52/539 |
| 4,028,450 | A | | 6/1977 | Gould |
| 4,191,722 | A | | 3/1980 | Gould |
| 4,544,595 | A | | 10/1985 | Tomason |
| 4,562,032 | A | | 12/1985 | Gaudreau |
| 4,844,853 | A | | 7/1989 | Ito et al. |
| 5,026,585 | A | | 6/1991 | Funatogawa |
| 5,295,340 | A | | 3/1994 | Collins |
| 5,711,126 | A | | 1/1998 | Wells |
| 5,965,626 | A | | 10/1999 | Tzeng et al. |
| 6,233,892 | B1 | * | 5/2001 | Tylman .................. 52/309.12 |
| 6,360,497 | B1 | | 3/2002 | Nakazima et al. |
| 7,168,221 | B2 | | 1/2007 | Hunter, Jr. |

(Continued)

*Primary Examiner* — Charles A Fox
*Assistant Examiner* — Joseph J Sadlon
(74) *Attorney, Agent, or Firm* — Malin Haley DiMaggio & Bowen, P.A.

(57) ABSTRACT

An improved building roof tile for a sloping roof including a polyurethane foam tile that includes outer coating layers that are made of a uniquely fire resistant or retardant layered system that includes a first outer fire resistant layer of 100% solid aliphatic polyurea material and a second inner layer of an 100% solid intumescent non-halogenated phosphate material, said inner layer forming a fire blocking partition and said outer layer offering UV protection, featherweight, category 5 hurricane proof, yields a high R-value, offer low thermal transference into attic space, will retrofit any sloped roof without structural build-up, can be molded into single or triple units, cannot break under foot or when extreme pressures are applied, can produce upgradable solar energy, is easy to transport and install and can molded to look like slate, wood, flat roll tile or most other historical tiles.

11 Claims, 19 Drawing Sheets

(56) References Cited

U.S. PATENT DOCUMENTS

| | | |
|---|---|---|
| D586,007 S | 2/2009 | Vandewater, Jr. et al. |
| 7,644,548 B2 * | 1/2010 | Guevara et al. ............... 52/223.1 |
| 8,468,754 B2 * | 6/2013 | Railkar et al. ................ 52/173.3 |
| 8,471,141 B2 * | 6/2013 | Stancel et al. ................ 136/246 |
| 8,701,360 B2 * | 4/2014 | Ressler ........................ 52/173.3 |
| 8,938,920 B2 * | 1/2015 | Cleereman et al. .......... 52/173.3 |
| 2008/0035140 A1 * | 2/2008 | Placer et al. ................... 126/622 |
| 2009/0004399 A1 | 1/2009 | Haynes et al. |
| 2009/0133340 A1 | 5/2009 | Shiao et al. |
| 2010/0269889 A1 | 10/2010 | Reinhold et al. |
| 2010/0296361 A1 | 11/2010 | Brown |
| 2011/0094169 A1 | 4/2011 | Bellavia |
| 2011/0174947 A1 | 7/2011 | Wu |

* cited by examiner

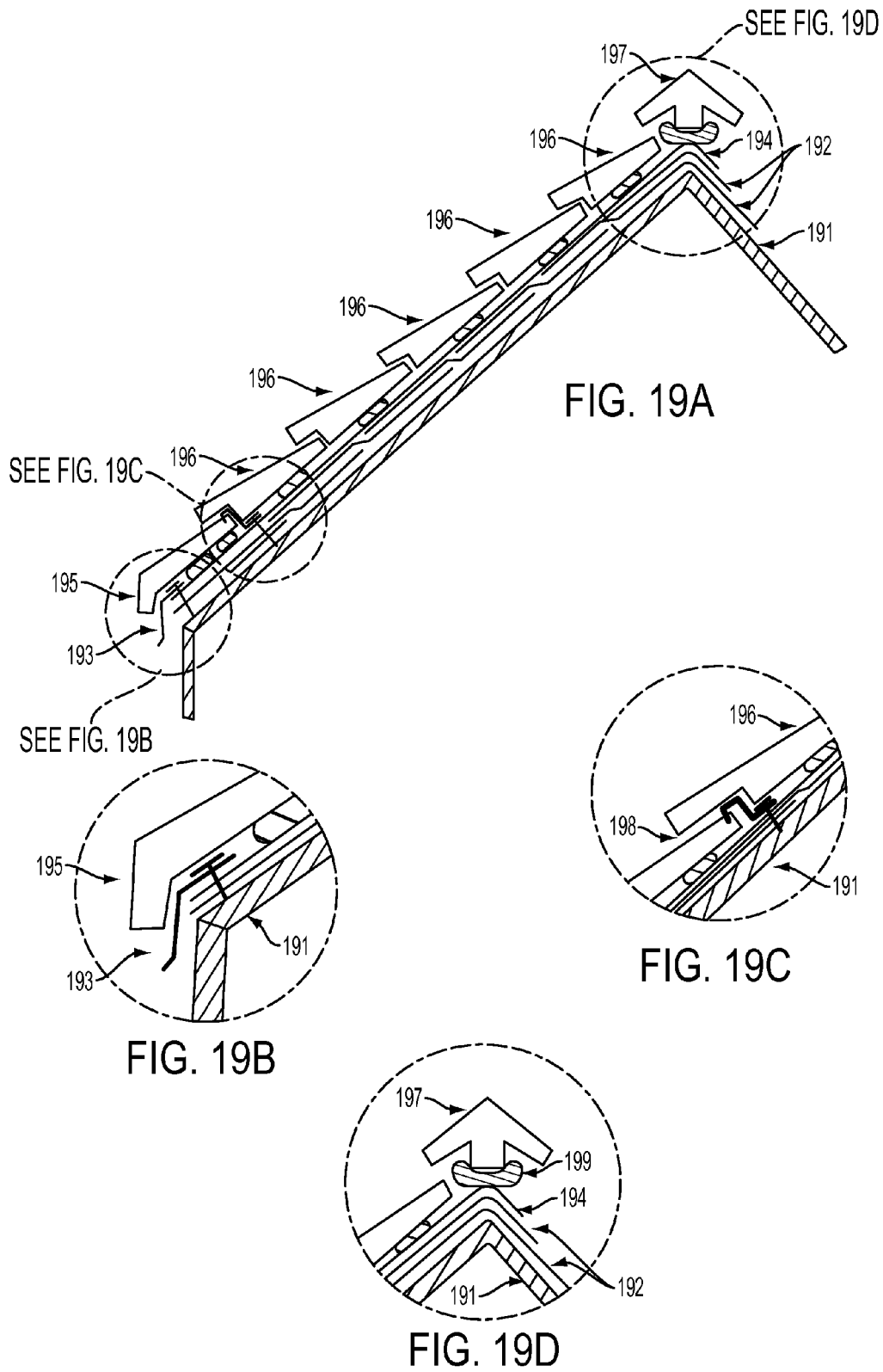

LIGHT WEIGHT MOLDED ROOF TILE WITH INTEGRATED SOLAR CAPABILITIES

CROSS REFERENCE TO RELATED APPLICATIONS

This application is a continuation-in-part of co-pending U.S. patent application Ser. No. 13/458,277 filed Apr. 27, 2012, which is a continuation-in-part of U.S. patent application Ser. No. 12/858,980, filed Aug. 18, 2010, which claims the benefit of priority to U.S. provisional patent application Ser. No. 61/255,629, filed Oct. 28, 2009.

BACKGROUND OF THE INVENTION

1. Field of the Invention

This invention relates generally to building exterior roof tiles and specifically to an improved building roof tile that is made of a uniquely fire resistant or retardant layered system, featherweight, hurricane proof, yields a high R-value for insulation, offers low thermal transference into attic space, is able to be retrofitted to any sloped roof without structural build-up, is molded into single or triple sized units, can produce upgradable solar energy, is easy to transport and install, cannot break under foot or when extreme pressures are applied and can be molded to look like slate, wood, flat or roll tile. The tile embodiment is made of closed cell polymeric isocyanate component and water based HCFC-2455fa blown in 3 lb or greater formulations or other fibrous materials.

2. Description of the Prior Art

Exterior sloped building roofs have used different materials such as asphalt-based products, metal, clay, cement, wood, slate, and rubber, for protecting a building from inclement weather such as rain, ultraviolet rays, heat, cold, snow, ice, and wind damage.

Typical roofs are made of plywood, tarpaper and shingles. Tiles are also used to cover the plywood and tarpaper. Traditional tiles are made in small pieces and are made of terra cotta, clay or other heavy, cementious materials. Traditional tiles create a great weight on the building structure requiring a more sturdy and costly construction of the building. Installing traditional tile is material and labor-intensive and requires hauling and lifting heavy loads of tile pieces and concrete for the setup work and throughout the installation and finishing process. Workers must cut traditional tiles with dangerous diamond blades powered by gasoline driven tools causing hazardous airborne particles to lungs and eyes.

The present invention overcomes several compounding problems of previously used tiles made of cement and ceramic materials by providing a dense 3-lb or 4-lb closed cell, featherweight poly foam-based, molded tile that is durable, has exceptional high wind resistance (over 225-mph), has excellent R-value for insulation so the invention does not retain and transfer heat or cold to the undersides of the roof deck or better termed "attic space", is far easier to cut with a hand saw and less expensive to install on a building's exterior slope or pitched roof deck.

Traditional concrete and terra cotta roof tiles are easily fractured and broken from the moment the tiles are de-molded until the time the tile installation is completed. Broken tiles are an expense that is passed on to the end user. Average breakage ranges between 5-10% each time tiles are loaded, transported and unloaded. Pallets of tile are all subject to this moving process no less than twice after manufacturing, yielding high waste and higher prices. The invention will solve this problem by formulating "roof tiles" out of polyurethane foam, mineral fiber or fiberglass, sturdy, completed and ready for palletizing immediately after de-molding, without the possibility of fracture thereby eliminating breakage due to its core composition coupled with distinguishing design characteristics.

Traditional tiles are subject to deterioration due to the composition of the products and the effect of the elements over time. This degradation causes tiles to become brittle and routinely fracture and break when basic maintenance is performed causing leaky puncture points in the substrate. The invention solves this problem by incorporating a thick-bodied, heavy-duty wedge design that brings the foundation or bottom side of the tile to rest onto the substrate/roof deck creating a wholly supported platform when installed using adhesive foam therefore, roof tiles will not/cannot, break under foot but has $1/17$ the weight of traditional tiles (volume-to-volume), yet will not crack/break during usual shipping, handling and installation due to its durable closed cell, polyblend foam or mineral fibrous core and its long-lasting, impact resistant flexible poly top coating.

Polyurethane based foams are the most insulating roofing systems available today. These products cure in seconds and are currently used only on flat roofs. Because of application limitations from on-site spray procedures, polyurethane based foams are unacceptable on pitched roofs because they cannot be satisfactorily finished, once cured. Also the flammability ratings of standard coatings or top layering for urethane flat roof systems that are applied after spray foam applications, are not approved for usage on a roof pitch over 2" on 12" i.e. "low slope". Poly coatings or plastics and polyurethane foams or other mineral fibrous materials can include additives allowing these byproducts to be labeled as fire resistant or retardant, which simply defined means said byproducts are not impervious to flame but rather when encountered by high temperatures caused by fire or other high heat circumstances, their additives react from the heat lending the byproducts to respond in one of two ways by either charring into an ash-like resin or turning from a solid state back into a hot liquid state before gravity disperses it. However when fire resistant or retardant poly coatings and fire resistant or retardant poly foams are applied to each other and introduced to a flame, the emissions released in both byproducts create a highly volatile discharge negating any/all fire resistant or retardant properties. This problem has never been rectified and has plagued industries for decades.

Applicant's tile resolves the fire resistance and fire retardance problems by manufacturing the foam tile using a multi-layering manufacturing process applying specific coating materials over the tile body polyurethane foams or other mineral fibrous materials. The invention introduces a fire blocking partition between the tile exterior/outer coating and the polyurethane foam tile body, but only a non-water based layer is applicable or else necessary bonding cannot occur. Under production, open tile mold cavities initially are robotically sprayed with a flexible byproduct mixture of an 100% solid aliphatic polyurea material, UltraViolet ray repellents and flame retardant/resistant additives yielding a durable top tile layer/surface coat that sets to tack in under one-minute. Secondly a rigid byproduct intumescent mixture based on a non-halogenated phosphate yielding a unique 100% solid epoxy sub-layer/beneath surface coat that serves as the fire blocking partition is introduced and is also robotically sprayed on the outer aliphatic layer and allowed to fully cure before closing the mold and injecting the tile body polyurethane foam or mineral fibrous material, permitting all in-mold products to simultaneously bond, thereby creating the first authentic fire resistant foam roof tile. Once the tile is removed from the mold, it is ready to be delivered and installed on any 3" on 12" or greater slope roof. The tile can also be correctly manufactured if the process were conducted in reverse.

Direct sunlight on hot days raises roof material temperatures well over 200 degrees and cool nights rapidly decrease roof material temperatures below 80 degrees. During these weather conditions, on the underside of the tile, condensation daily drips down onto the substrate causing rapid substrate deterioration. Therefore tile roof systems need frequent maintenance and often leak after a short service time due to constant moisture. The Applicant's tile solves this problem by the product's high thermal insulating core that eliminates thermal transfer from the top to the bottom side of the roof tile yielding a much greater lifecycle to the substrate due to the fact that the Applicant's tile temperature only yields minor fluctuations on its exposed surface area. If the temperature outdoors is 85 degrees Fahrenheit, then the surface area of the Applicant's tile core will represent substantially that intensity even in direct sunlight, thereby virtually eliminating contrary temperature elevations and their transference to the undersides of the roof or better termed "attic space" preventing unbearable conditions just above the living or working space of a residential or commercial property.

Available tile roof systems need frequent maintenance and leak after a short service time due to rain/water penetration between roofing tiles that flows down onto the substrate also causing rapid substrate deterioration. The Applicant's tile solves this problem by the product's multi-casting pieces into (3-in-1) increased area per tile or triple/tri-tiles that reduce side lapping by over 60% on the roof lay-outs and by overlapping the tiles in a manner that inter band in a building block fashion which makes water penetration much more difficult if not mostly impossible.

Available pitched roof systems cannot hold up against category five (cat-5) hurricane winds. The Applicant's tile solves this problem by testing and achieving over a 200+ mph wind uplift rating without suffering any damage. This rating demonstrates that the invention can withstand any hurricane force wind and protect the structure it is properly installed on greatly minimizing storm damage and insurance claims plus premiums.

Hailstorms can damage most roof systems and sometimes facilitates major water penetration into the building and massive damage to building's interior. The Applicant's tile roof solves that problem because of each tile's pliable/crack resistant top layer and sub-layer coatings, plus the thickness and density of the Applicant's tile's core. When a tile is struck, even if hard enough to dent the tile, tile will not permit water penetration. Applicant's tiles can be easily repaired or replaced individually if damaged.

Traditional tile roof systems are highly material and labor intensive. The Applicant's invention solves these problems because the roof tiles are extremely lightweight. Roof tile installation is not complex, and requires far lesser amounts (±35%) of poly foam adhesive and caulking to install. The need for additional mechanical roof tile fasteners that create leaking points due to nail or screw penetrations into/through the substrate beyond the bottom/start row on any structure's sloped roof is eliminated when tile needs applied on steep slope roofing areas.

Solar panels are attached to roofs to generate electricity. Solar panel brackets are attached to metal legs or stands that penetrate roof systems thus requiring special flashings and patching points. Solar panels create additional weight on structures plus their brackets, metal framing and bases, require separate installation, add no insulation, and create potential drafting and leak points in a roof surface. A typical solar panel uses a series of photovoltaic cells permanently mounted together that cannot be upgraded or renewed to meet significant improvements in solar cells without replacing entire panels. The Applicant's roof solves these issues by recessing/embedded solar photovoltaic cells encapsulated within a durable tile-sized "Module" eliminating leaky metal brackets, and heavy metal framing and bases. Individual tiles and/or their individual "Modules" are easy to upgrade. Simply detach "Modules" using common fastening methods (screws or supplied stock), unplug and sporadically replace a few "Modules" in the future, thereby making solar energy generating roof tiles very easy and affordable to boost power with tomorrow's advancements and eliminate the need to ever consider replacing costly large solar panels on a rooftop.

Solar panels installed on brackets that are attached to metal legs or stands, require removing said panels to replace the roofing material every 15-30 years (depending on the type of roof system) and then separately re-installed again, creating a variety of potential problems from panel breakage, to additional labor costs, to incorrect electrical and/or securing mechanical fastenings. The Applicant's roof solves these issues by greatly increasing the roof tiles' life expectancy (70+ years) and recessing/embedded solar cells encapsulated within a durable "Module" that is easily replaced by substituting the solar module back into the roof tile with simple fasteners, thus eliminating the need to remove and replace any large solar panels due to dissimilar roofing material degradation or a solar cell's accelerated short term life span. Simply replace the "Module" set in the tile without disturbing the tile or roof substrate.

Solar panels that are the interlocking, surface mounted type (installed without brackets and metal legs) are mechanically fastened directly to the roof deck and double as the main barrier between the weather and the structure. Pre-existing rooftops must be exactly the same size in length and width as the installed combination of these types of solar panels or they must be interwoven with other roofing material types to protect balance roof areas not covered by the panels. Intermixing different roofing materials creates potential drafting and leak points in a roof surface. The invention solves these issues by perfectly retrofitting any sloped roof deck end to end (like traditional roof tiles) without the need for solar panel bracket or additional structural build-out and extra engineering costs due to invention's featherweight core and easy installation advantages. The total installed weight of the invention per square foot with any desired substrate, equals the same or less installed weight as any regular or heavy duty asphalt shingle that are universally approved for usage on every pitched roof over a 3-on-12 slope.

SUMMARY OF THE INVENTION

An absolutely fire resistant array of highly insulated, premolded featherweight poly foam tiles for a sloped roof configured to fit together to complete a building exterior roof covering that is aesthetically similar to a traditional tile roof, withstands any hurricane force winds, yields high R-values, offers low thermal conduction through tiles into an attic space and retrofits onto any sloped roof without structural build-up. The individual tiles can be molded into single area or triple area units. Each tile does not break under foot or when extreme downward compression forces are applied. The tiles can be factory molded to look like slate, wood, flat, roll tile or some other style if design needs to match historic tile types. In an alternate embodiment, certain tiles will include easily removable and upgradable solar photovoltaic cell "Module" that will produce solar energy. The tiles are lightweight and therefore easy to transport and install.

Each molded tile is configured for placement at a predetermined location on the roof structure such as the roof peak or top, the start/first row of tiles along the bottom row of the roof and the field tiles, which are tiles that are installed between the roof peak and the bottom row of tiles. The hip and ridge tiles are installed at the roof's peak and the rake tiles are installed at the roof's side/gable ends.

The tiles of the present invention are molded from poly foam or comparable material from which each of the tile pieces are made in separate molds. There is a different mold for the field tiles, a different mold for the start row tiles, a different mold for the solar tiles, a different mold for the hip or ridge tiles, and a different mold for the rake tiles. All of the tile pieces for the roof are uniquely manufactured and can be manipulated to appear like any roof product desired.

In one embodiment the composition of the tile that is molded uses a complementary system of polymeric isocyanate "A"-component and a composite water-based (HCFC-245fa) blown "B"-component. Using these ingredients, the mixture produces a tile that has lightweight and excellent thermal insulation characteristics. Other compositions for specific roof applications involve modifications to the polyurethane A and B mix as well as mineral fiber and fiberglass cores. Additives for mold control are examples of modifications. Each tile can also include a finish coat that may include gel coat and similar additives. Each tile includes an outer layer coating for wear plus UV protection and a sub-layer coating to create a fire blocking partition on a polyurethane foam tile that can be safely used on a sloping roof as explained below.

Applicant's tile solves the fire resistance and fire retardants problems using a multi-layering manufacturing process that applies two separate layers of different specific materials over the tile body polyurethane foams or other mineral fibrous materials. The two separate layers create on the tile body a fire blocking partition between the poly outer/surface coating and the polyurethane foam tile body, but only a non-water based layer is applicable or else necessary bonding cannot occur. Under production, open tile mold cavities initially are robotically sprayed with a flexible byproduct mixture of an 100% solid aliphatic polyurea material, UltraViolet radiation repellents and flame retardant/resistant additives yielding a durable outer layer/surface coat that sets to tack in under one-minute. Secondly an intumescent mixture based on a non-halogenated phosphate yielding a unique 100% solid epoxy sub-layer/beneath surface coat that serves as the fire blocking partition is also robotically sprayed onto the cured aliphatic material layer in the mold and allowed to fully cure before closing the mold and injecting the polyurethane foam or mineral fibrous material that forms the tile body, permitting all in-mold products to simultaneously bond, thereby creating the first authentic fire resistant and retardant foam roof tile. Once the tile is removed from the mold, it is ready to be delivered and installed on any 3" on 12" or greater slope roof. The tile can also be correctly manufactured if the process were in reverse. For example, the foam tile body is molded and removed from the mold. The inner intumescent layer mixture based on a non-halo-genated phosphate is applied to a roof tile as a coating except on the bottom recess portion of the tile. Once the inner coating has set, the outer coating is applied over the inner layer. The outer coating includes aliphatic poly materials and ultraviolet ray repellents creating an outer layer on the tile which is also not sprayed on the tile bottom recess as explained below.

All of the tile pieces for the roof are pre-molded with outer layer and sub-layer coatings before being delivered to a distributor or building site where the tile pieces are attached to the roof as described herein.

As an example, a commercial or residential building may have a wooden frame with a plywood sheet roof. A substrate may be prepared and applied to the roof deck with a hot or cold asphalt cap sheet or peal-n-stick with granular type material or any other type of suitable substrate to which the tiles will be attached for high wind areas. Once a substrate has been installed and cured, customary poly foam adhesive (different than the tile composition) is used to attach all tiles to the substrate.

Both the field and start row tiles have on their back sides recessed or domed areas having grooves that are of a predetermined pattern that accesses the tiles' polyurethane foam core. The molded roof tile having a substantially flat bottom surface that rests into full contact with roof slope, said bottom surface including a recessed area of a predetermined shape that includes poly adhesive receiving grooves/channels that increase adhesive area by 23%, said recessed area not having any layers of fire blocking materials and not having a layer of fire resistant UV blocking material thereby exposing the core body composition of the roof tile for engagement with standard poly adhesive used to attach the roof tile to the roof substrate. These recessed areas utilize approximately 35% less poly foam adhesive that is applied to the roof substrate than traditional tiles. The tile core from production will be temporarily exposed (without top or sub layer coatings) at the tile underside only within the recessed, single dome/depression like area until adhesive foam is added and exposed area is set facing down against substrate by a roof installer, thereby establishing 100% foam filled core with full foam to adhesive foam contact for maximum holding/bonding power.

Individual foam roof tiles are manually placed on the roof substrate and are allowed to have the poly foam adhesive harden firmly, thereby attaching the closed cell foam roof tiles to the poly foam adhesive and to the roof substrate. The roof tiles are installed on the roof in semi conventional fashion due to the fact that start and field tiles are available in triple area sizes, something traditional tiles could never offer due to conventional tiles extreme weight and easy fracture/breakage during shipping and installation even if outfitted with wire mesh during the manufacturing process.

Triple area sized tiles or tri-tiles expedite installation for installers saving time and money while adding overall weight to the tripled area tile for better bonding, The start tile is installed at the bottom roof edge and offers a lip or butt that aligns and overlays the bottom edge for moisture run-off without moisture reaching the roof's edge, averting certain water damage over long periods of time. Tri-field (three times wider than a single tile) and single field tiles attached in horizontal rows, are then overlapped row by row from roof bottom to roof peak. Rake tiles are installed at the start row's and field row's end and serve more as ornamental in nature. At the very peaks of the roof, the hip or ridge tiles are adhered to the roof using poly foam adhesive. Note that the field tiles and the bottom row tiles have top and bottom plus side-overlapped segments that inter band in a building block fashion for straight, mistake free application. The tiles are staggered to provide brick like format from row to row for efficient moisture run-off.

There is a rigid metal "Z" bar, which is mechanically fastened at the top edge of a completed bottom row of start tile to prevent vertical tile slippage so other tiles (called field tiles) installed above the bottom row can be immediately installed without worry of downward tile displacement/compromises prior to full curing of tile adhesive bond to tile and to substrate It is an object of this invention to provide an improved molded roof tile made of a specific polyurethane foam (preferably product types approved by Miami Dade Code Compliance Center) that is featherweight, can withstand category five hurricanes, yield a high R-value for insulation, offer low thermal conduction into an attic space, retrofits any sloped roof without structural build-up, can be molded into single or triple area units, cannot break under foot or when extreme pressures are applied, can include removable/replaceable solar "Modules" that produce electricity, is easy to install and can be molded to look like slate, wood, flat roll tile or some other style if design needs to match historic tile types.

An extremely important object of the invention is to provide a polyurethane foam roof tile having a fire blocking barrier that allows the polyurethane foam roof tile to be safely used on a sloping roof.

BRIEF DESCRIPTION OF THE DRAWINGS

FIG. 19 A shows a schematic side elevational view of an array of roof tiles representing the invention mounted on a roof. FIG. 19B shows an enlarged cutaway view of the lower edge of the roof shown in FIG. 19 A. FIG. 19 C shows an enlarged cutaway view of a portion of the roof shown in FIG. 19 A. FIG. 19 D shows and an enlarged cutaway view of the roof peak of the roof shown in FIG. 19 A.

PREFERRED EMBODIMENT OF THE INVENTION

Figure 1:
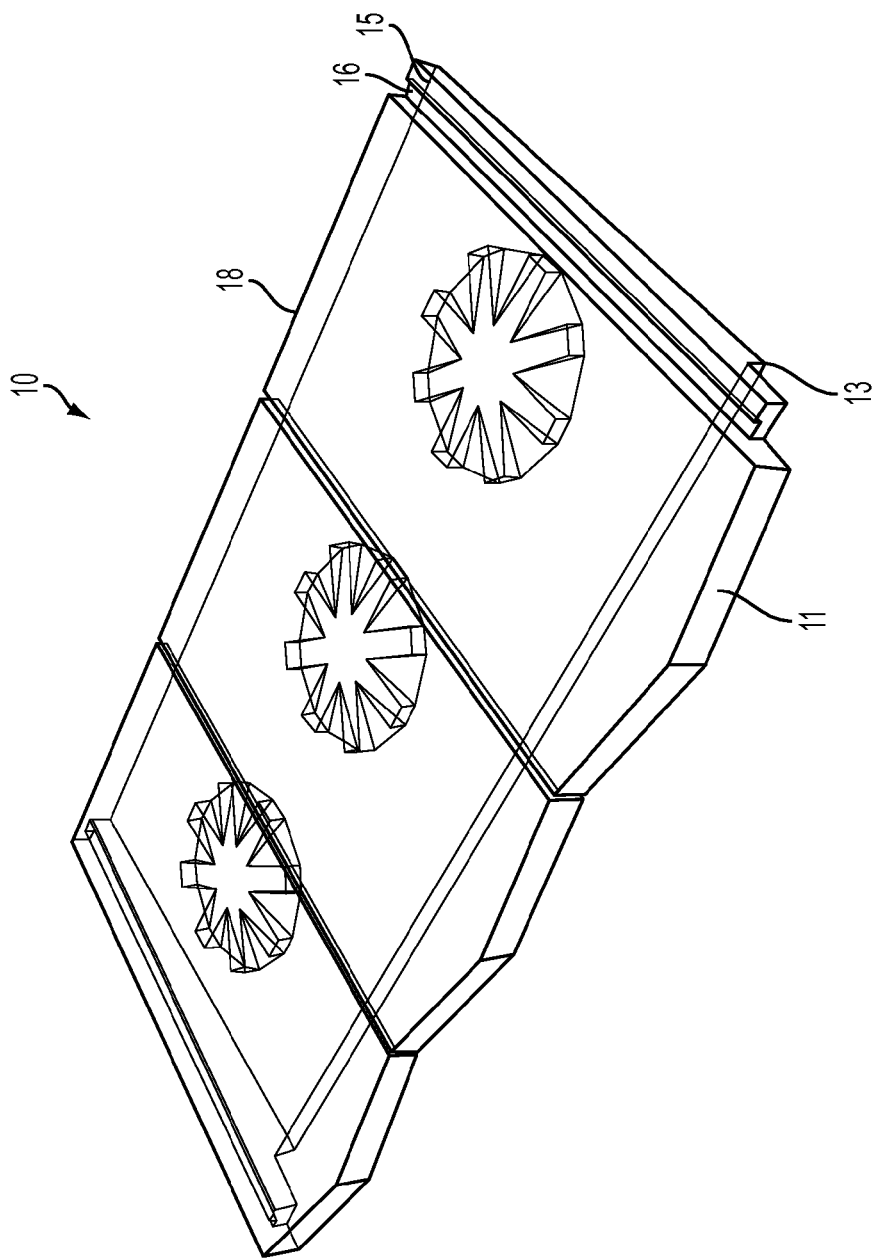
FIG. 1 shows a top perspective view of the tri-field tile used in the present invention.

Referring now to the drawings and in particular FIG. 1, a molded tri-field tile 10 is shown from a polyurethane material preferably polymeric isocyanate and a water-based (HCFC-2455fa) blown component.

The tile 10 has an outer layer of a 100% solid aliphatic polyurea material, and in addition ultraviolet ray protectors. The tile 10 also has a second inner layer or sub-layer that is a unique 100% solid intumescent mixture based on a non-halogenated phosphate creating a solid epoxy sub-layer. The inner layer provides a fire blocking barrier to protect the polyurethane foam body of the tile from fire. The entire exterior surface of the tile 10 is not covered with the fire retardant and blocking fire layers. The tile bottom surface which includes a recessed portion explained below does not receive the fire retardant and fire blocking outer and inner layers coatings.

The length of the tri-field tile 10 is three times longer than a single tile. The tri-field tile 10 includes a side edge return portion 15 that is used to create a gutter-like system for each field tile with an adjacent tile having a reversed portion 16 so that adjacent tiles inter band in a side-by-side row building block fashion. The tile top end 18 is flat and butts against a wedged portion 13 shown in FIG. 3. The tile bottom face portion 11 shown in FIGS. 1 and 2 is the topside edge of the top-over-bottom overlap and positioned in brick-like fashion regarding tiles 10, and directly above tile 40 shown in FIG. 4 shown within.

Figure 2:
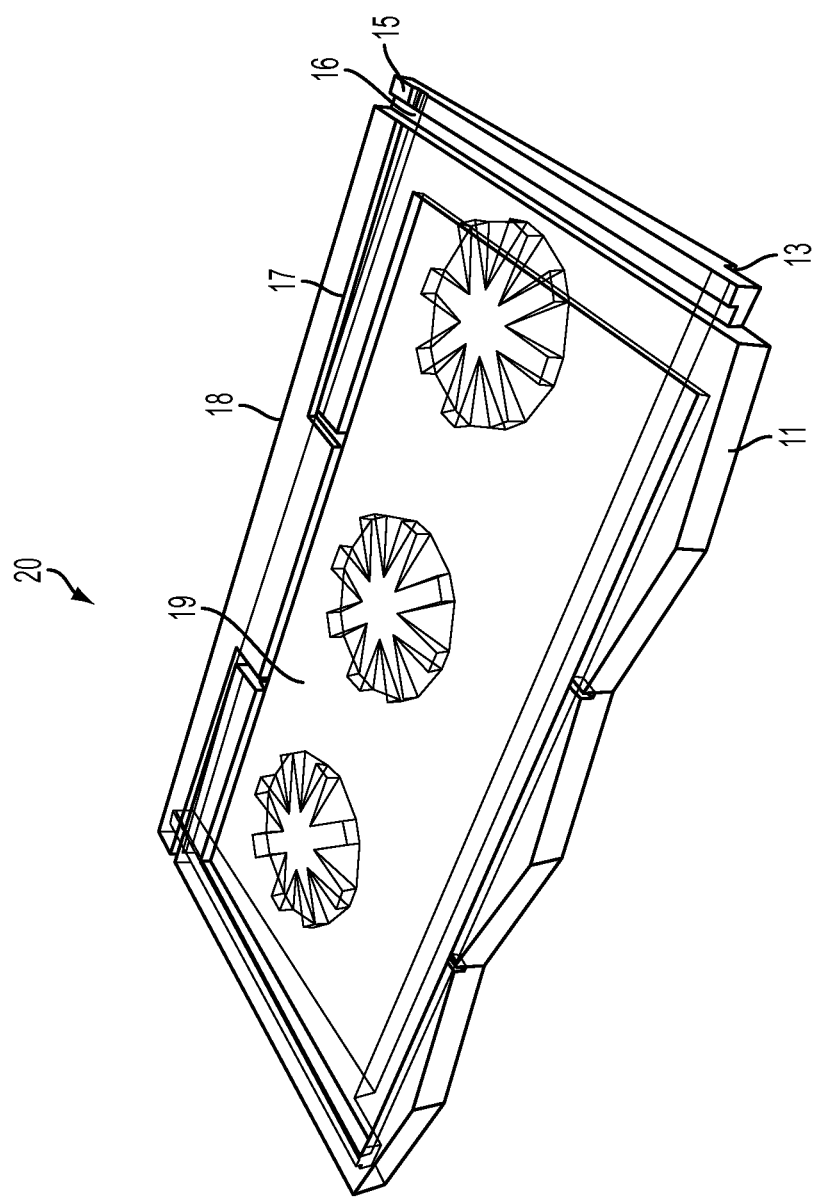
FIG. 2 shows a top perspective view of the tri-solar module tile used in the present invention.

An alternate embodiment such as molded tri-solar module field tile is shown in FIG. 2. Tile 20 is molded from a polyurethane material preferably polymeric isocyanate and a water-based (HCFC-2455fa) blown component. The a tri-solar tile 20 includes a large recessed flat surface 19 for receiving removable solar "Module" (not shown) and smaller recessed areas 17 for tri-solar tile to tri-solar tiles' electric cable connectivity. Tri-solar tiles 20 like tri-field tiles have reversed portions 15 and 16 as well as flat edge 18, bottom edges 11 and 13.

Figure 3:
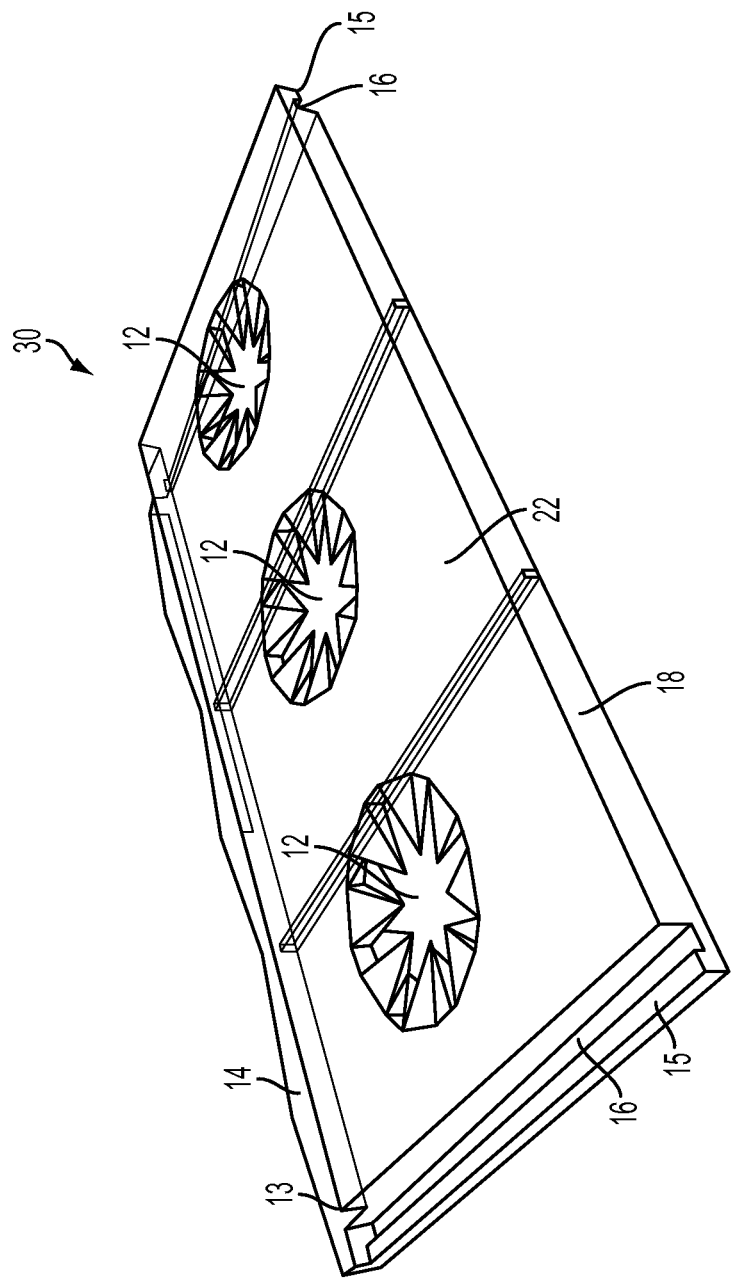
FIG. 3 shows a bottom perspective view of the tri-field and tri-solar module tile used in the present invention.
Figure 4:
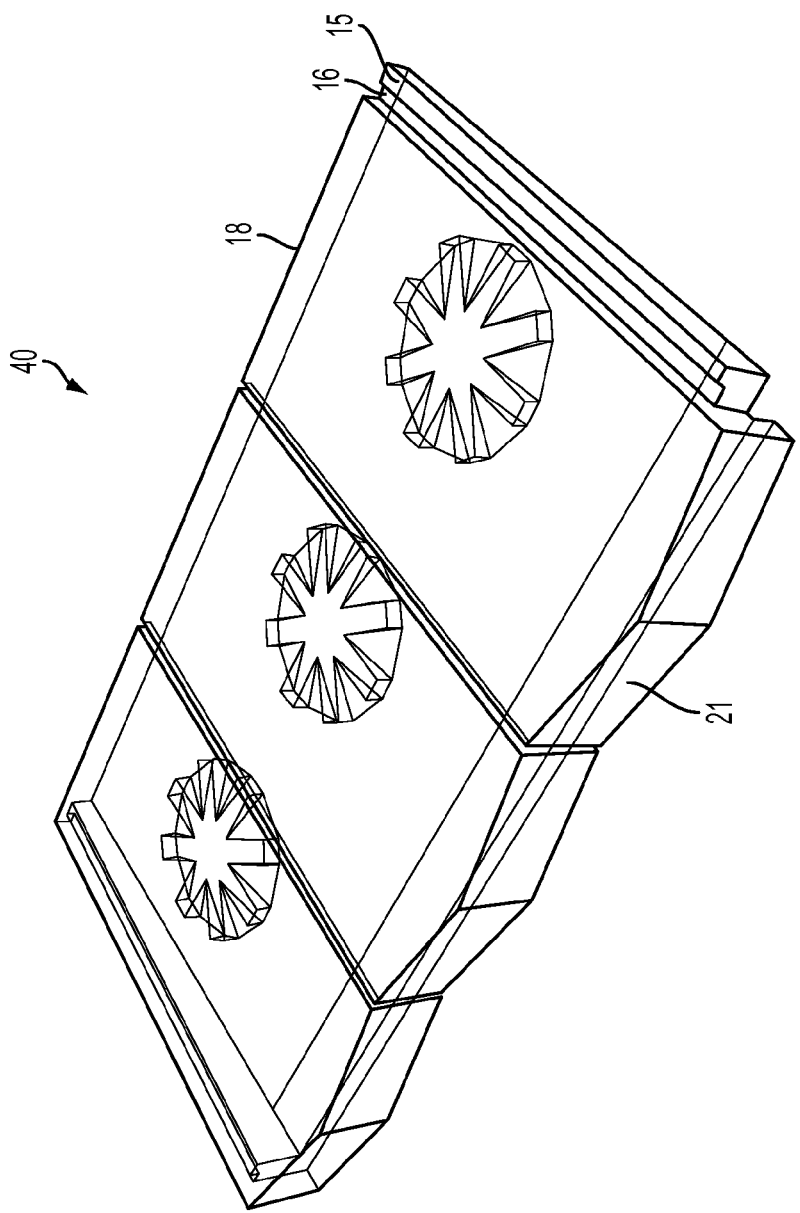
FIG. 4 shows a top perspective view of the tri-start tile used in the present invention.

Tile 30 shown in FIG. 3 represents the underside perspective of the tiles shown in FIG. 1 and FIG. 2 show as they would appear after molding from a polyurethane material preferably polymeric isocyanate and a water-based (HCFC-2455fa) blown component. Both the tri-field tile 10 and the tri-solar tile 20 bottoms shown in tile 30 includes three dome like recessed areas 12 with grooves expanding outwardly considerably increasing surface contact areas 12 that are sufficiently deep to receive foam adhesive (not shown), that is used to firmly attach tiles 10 and 20 to a roof substrate. The tile 30 inside core will be temporarily exposed at the tile underside 12 only within the recessed, single dome/depression like area 12 until adhesive foam is added by a roof installer, thereby establishing 100% foam filled core area with full foam to adhesive foam contact for maximum holding/bonding power.

Also shown in FIG. 3 a lower step-like portion 14 which is used to overlap the tile below the tile shown in FIG. 1 when a roof is done. Tile 30 as shown also has same reversed portions 15 and 16 plus edges 11, 13 and 18.

When applied, poly foam adhesive is setting up in the semi cured stage to allow expansion over several hours to dry. To attach the tiles 10, 20, 40, and 60 to a roof substrate, the tiles' bottom flat wedge surface 13 is placed in direct contact with a substrate (not shown) coated with foam adhesive and tile body bottom recessed dome and grooves 12 are filled with foam adhesive that binds the tile bottom 22 to the roof substrate. The poly foam adhesive is measurably applied into the tile dome recess and grooves 12 thus filling the empty recessed areas and rectangular grooves that increase contact areas to the tiles' foam core for analogous core to adhesive bonding for a weld-like bond.

After the tile dome 12 is measurably filled with poly foam adhesive and during the adhesive foam setup, the tile is to be flipped and positioned in place against the roof substrate. The foam adhesive continues to sets up and cures until the tile is firmly attached to the roof substrate. The bottom surface recessed dome 12 could be ⅝ inch deep, or sufficiently deep to attach the tile to the substrate.

The tiles 10, 20, 40, 60 shown in FIGS. 1, 2, 4, 6 are the primary tiles used with the present invention and are used in all the areas on the roof except the very peaks and edges of the roof. All tiles shown in all Figures can be hand-sawed to change the length or to fit along the side edge if necessary. The R-value of the tiles shown 10, 20, 40, 60, 80 in FIGS. 1, 2, 4, 6, 8 is extremely high for insulation against heat and cold, extremely effective against thermal conduction and is also extremely lightweight because each tile is made of molded polyurethane foam like material.

Tile 40 shown in FIG. 4, a tri-start tile shown as it would appear after molding from a polyurethane material preferably polymeric isocyanate and a water-based (HCFC-2455fa) blown component. The a tri-start tile 40 includes a large, thicker butt or face 21, which shows that tile 40 is used as the start row of roof tiles at the bottom edge of the roof. This bottom face 21 portion is twice as thick as the tile face portions 11 shown in FIGS. 1 and 2 can extend below the roof deck line but not beyond the roof's bottom side-edges as the last tile at the bottom of the roof. Tile 40 is configured differently than tiles 10 and 20 due to the placement of tile 40 at the bottom edge of the roof to provide an aesthetic shape and effective moisture run-off. Tile 40 shown also has reversed portions 15 and 16 plus edge 18. The tri-start tile 40 is made of and molded from the same material as the field tile 10 in FIG. 1 and tile 20 in FIG. 2 which is a polyurethane foam composition described above which is individually molded for each piece and is extremely lightweight. The tri-start tile 40 also provides an aesthetic look like a conventional clay, cement, slate or wood shake tiles as can all tiles that are mentioned in this preferred embodiment section.

Figure 5:
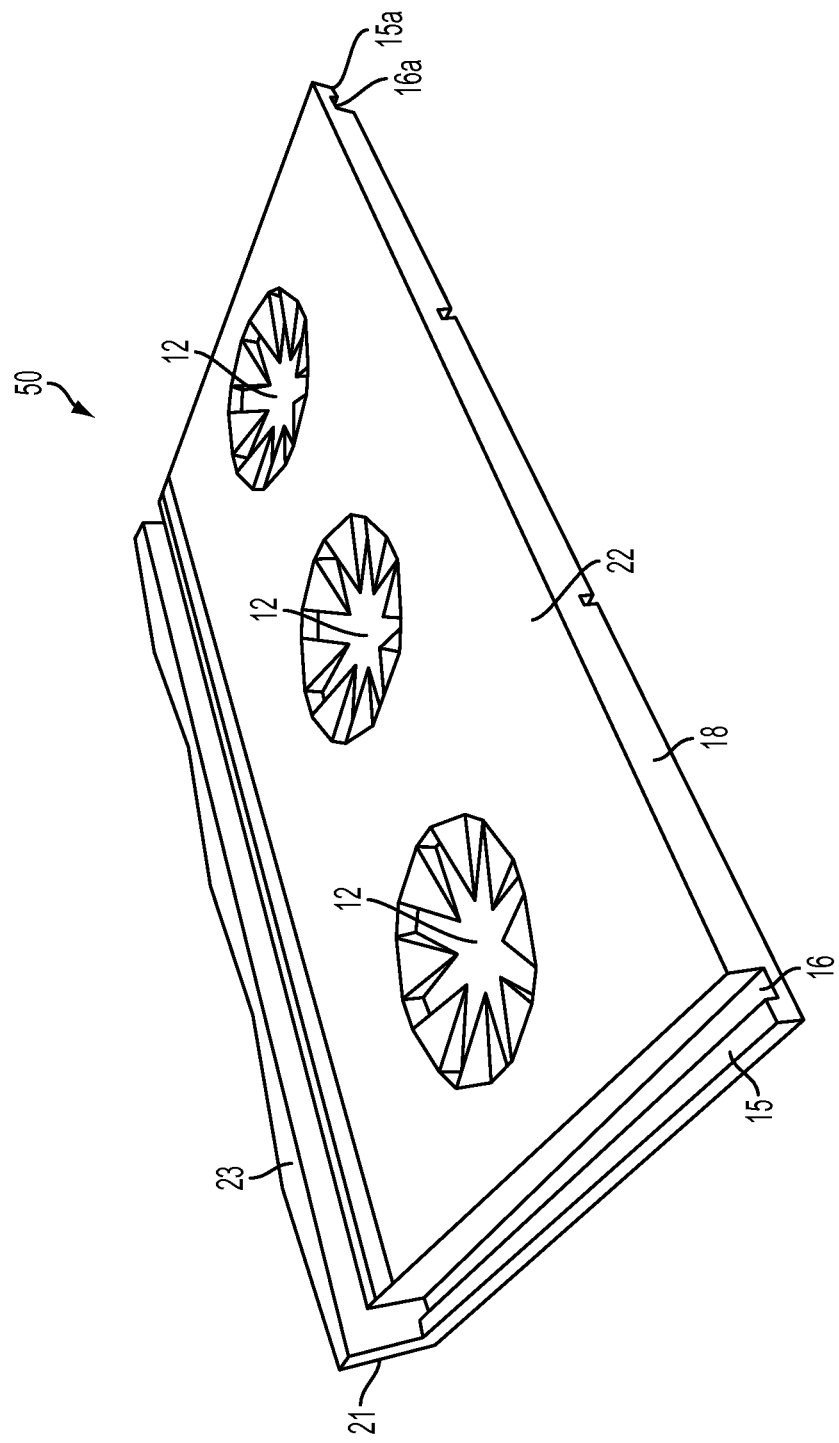
FIG. 5 shows a bottom perspective view of the tri-start tile used in the present invention.

Tile 50 shown in FIG. 5 is the underside perspective of FIG. 4 shown as it would appear after molding from a polyurethane material preferably polymeric isocyanate and a water-based (HCFC-2455fa) blown component. The underside of a tri-start tile 50 includes the surface area 22 which shows the domed pattern 12 for receiving poly foam adhesive for attaching the start row roof tile 50 to the roof substrate. The tile overlap area 23 underside portion is a-typical of the wedged portion 13 shown in FIG. 3 due to start-tiles are installed at the very bottom row and do not have other tiles to overlap in top-over-bottom fashion. The tile underside portion 23 is almost entirely filled in so to rest on the roof deck, however angled just a bit to allow room for metal drip-edge routinely installed under substrate at the bottom edge of the roof, so not to compromise the angle of the start-tiles in comparison to the angles of the installed tiles 10 and 20.

The tile 50 also includes the side edge return portion 15 that is used to create a gutter-like system with an adjacent tile having a reversed portion 16 so that the tiles inter band in a side-by-side row building block fashion. The bottom surface 22 of the bottom roof tile is shown.

Figure 6:
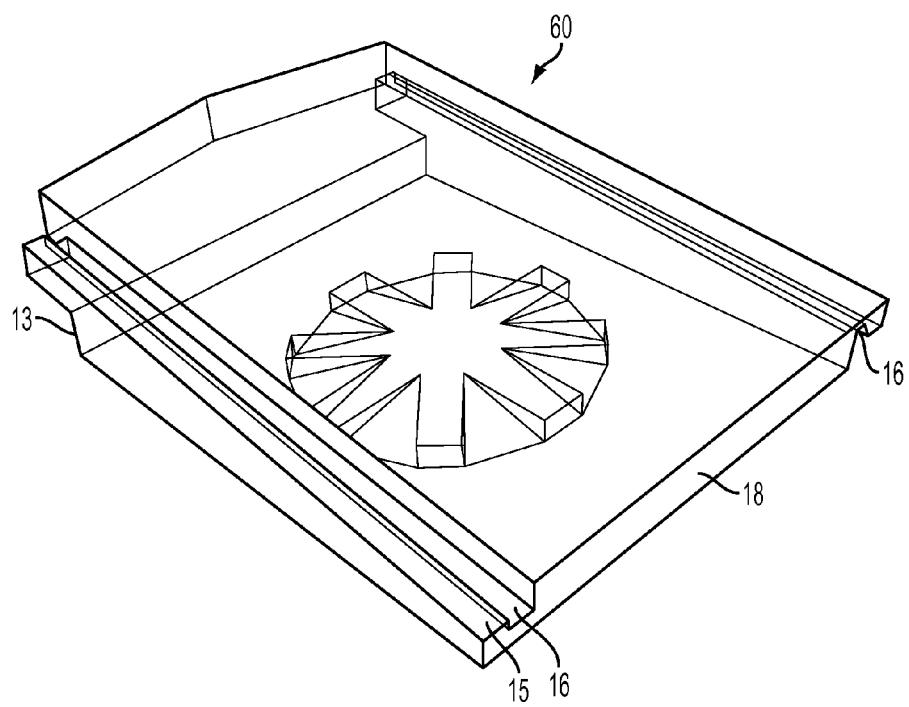
FIG. 6 shows a top perspective view of the single field tile used in the present invention.

Tile 60 as shown in FIG. 6 is a single-field tile as it would appear after molding from a polyurethane material, preferably polymeric isocyanate and a water-based (HCFC-2455fa) blown component. The a single-field tile 60 includes a side edge return portion 15 and groove 16 that is used to create a gutter-like system for each field tile with an adjacent tile having a reversed portion 16a so that the tiles inter band in a side-by-side row building block fashion. The top end 18 is flat and butts against a wedged portion 13 shown in FIG. 3. The face portion 11 shown in FIGS. 1 and 2 is the topside edge of the top-over-bottom overlap and positioned in brick-like fashion regarding tiles 10 and 20 and directly above tile 40 shown in FIG. 4 shown within.

Figure 7:
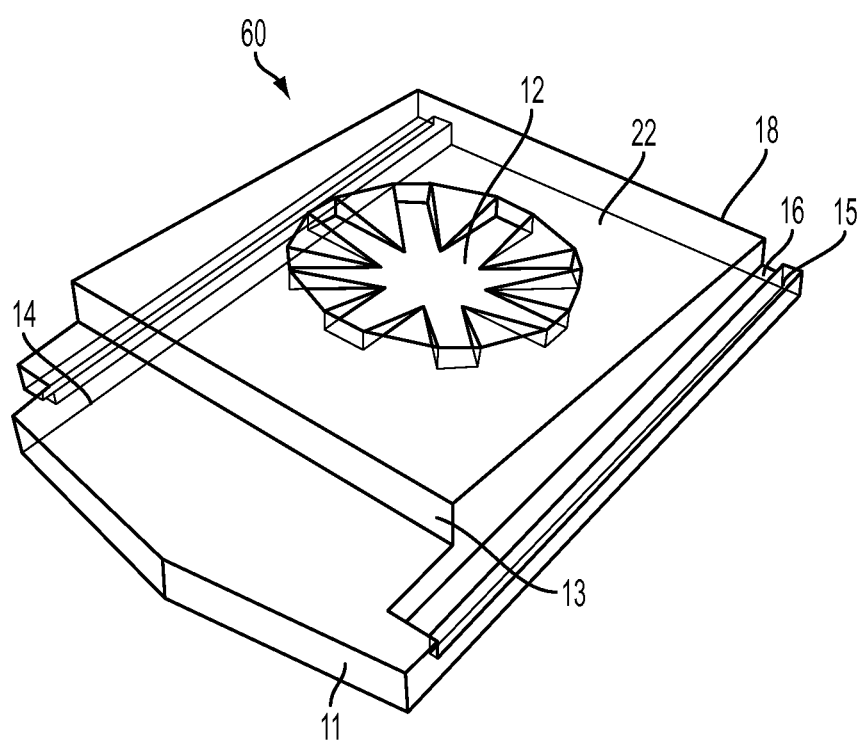
FIG. 7 shows a bottom perspective view of the single field tile used in the present invention.

Tile 60 shown in FIG. 7 shows the underside perspective of the tile 60 of FIG. 6 shown as it would appear after molding from a polyurethane material preferably polymeric isocyanate and a water-based (HCFC-2455fa) blown component. The underside of a single-field tile 60 includes a dome like depression with rectangular probes/deviations expanding outward considerably increasing contact areas 12 that is sufficiently deep to receive foam adhesive (not shown) that is used to firmly attach tiles 10, 20, 40, 60 to a roof substrate. Also shown in FIG. 7 a lower step-like portion 14 which is used to overlap the tile below the tile shown in FIGS. 1, 2, 4, 6 when a roof is done. Tile 60 shown also has same reversed portions 15 and 16 plus edge portions 11, 13 and 18.

Figure 8:
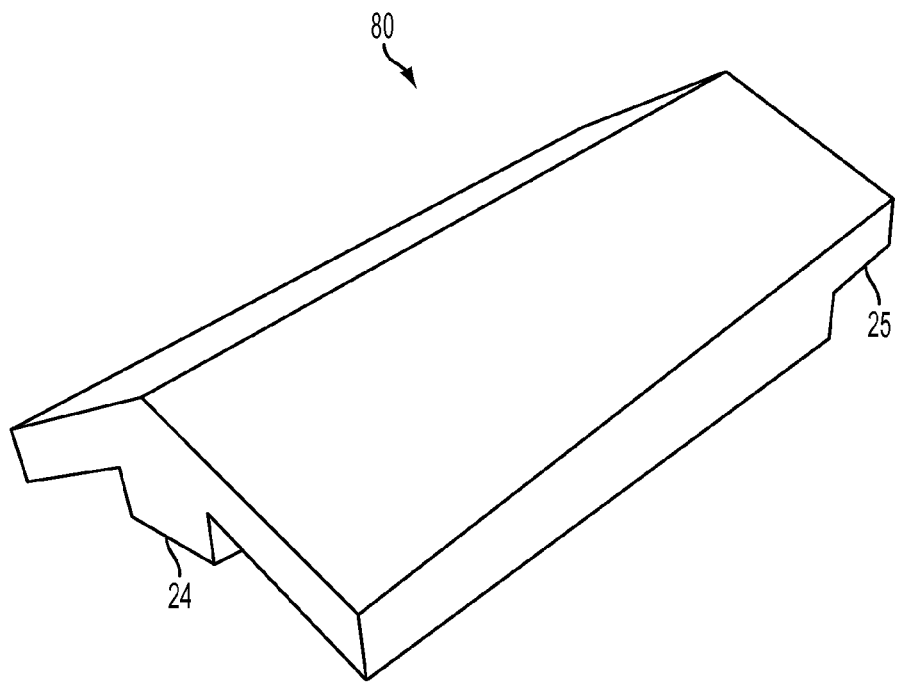
FIG. 8 shows a top perspective view of the hip and ridge tile used in the present invention.

Referring now to FIG. 8, the molded hip-and-ridge tile 80 shown as it would appear after molding from a polyurethane material, preferably polymeric isocyanate and a water-based (HCFC-2455fa) blown component. The hip-and-ridge tile 80 is shown which is used where the different field tiles meet and at the very top of the roof peak or ridge for covering and joining the upper row of field tiles at the peak of the roof. The ridge tile 80 is molded and made of the same material as all tiles FIGS. 1, 2, 4, 6 and is very light weight. Tile 80 can also be overlapped through recessed portion 25 at one end.

Figure 9:
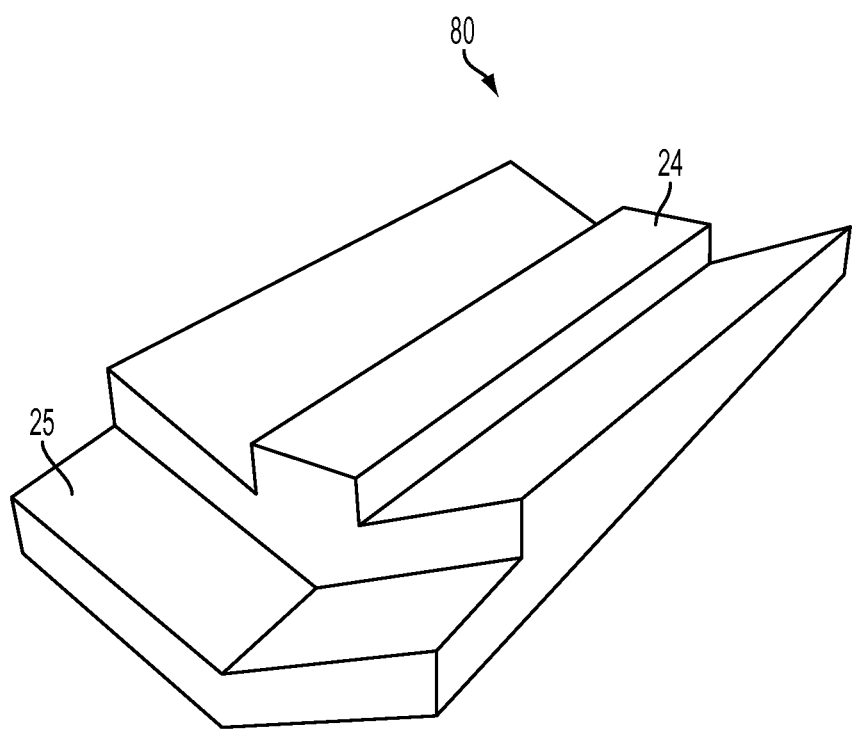
FIG. 9 shows a bottom perspective view of the hip and ridge tile used in the present invention.

Tile 80 in FIG. 9, shows the underside perspective of the tile 80 of FIG. 8 shown as tile 80 would appear after molding from a polyurethane material preferably polymeric isocyanate and a water-based (HCFC-2455fa) blown component. The underside of a hip-and-ridge tile includes a flat bottom surface 24 of ridge can also receive adhesive foam along its bottom for attaching the tiles 10, 20, 40, 60 to the adjacent field tiles or hip for covering and joining the upper row of field tiles at intersections where slope of roof changes angles or direction. Tile 80 also shows the overlapped recessed portion 25 at one end.

Figure 10:
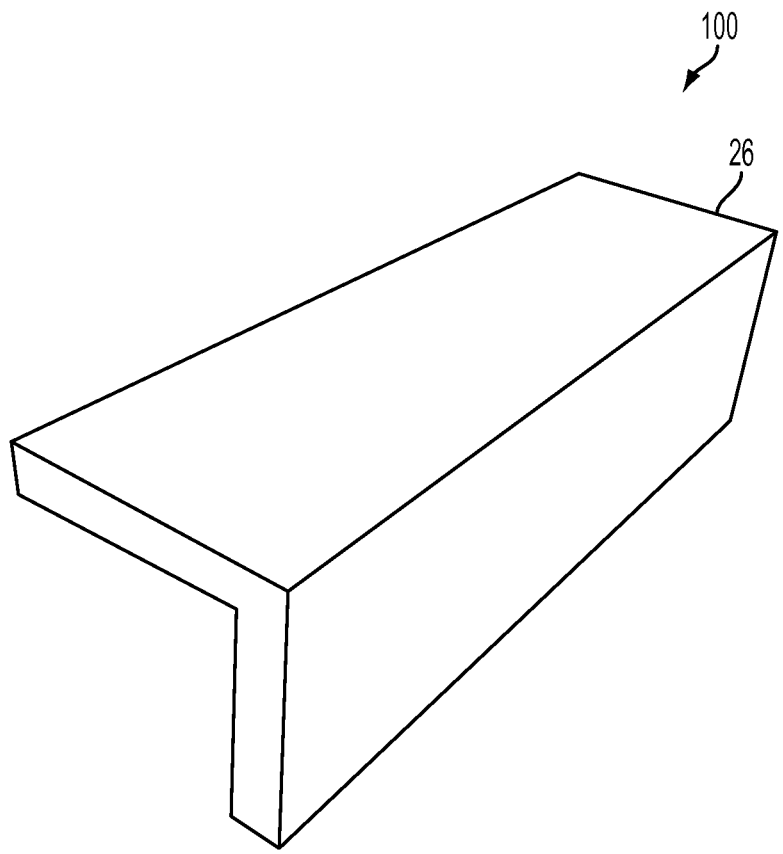
FIG. 10 shows a top perspective view of the rake tile used on the far edges/gable ends in the present invention.

Referring now to FIG. 10, the molded rake tile 100 shown as it would appear after molding from a polyurethane material, preferably polymeric isocyanate and a water-based (HCFC-2455fa) blown component. The rake tile 100 shown which is used where the different field tiles stop and at the edges or gable ends for covering the upper row of field tiles at the roof's periphery mainly for decorative trim effects. The rake tile 100 is molded and made of the same material as all tiles FIGS. 1, 2, 4, 6, 8 and is very light weight. Tile 100 can be overlapped without a recessed portion unlike other molded tiles but shows a thinner/smaller end 26 where overlap occurs.

Figure 11:
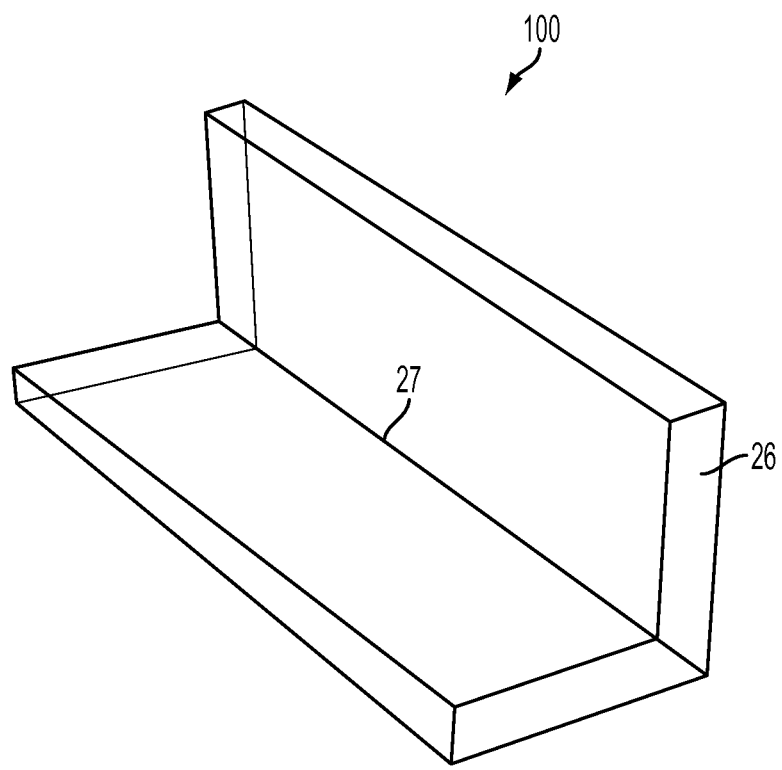
FIG. 11 shows a bottom perspective view of the rake tile used on the far edges/gable ends in the present invention.

Tile 100 in FIG. 11, shows the flat underside surface of rake tile 100 which can also receive adhesive foam along its inside corner 27 for attaching the tile 10, 20, 40, 60 to the adjacent field tiles or hip where different fields of tile stop and at the edges or gable ends for covering and trimming off the upper row of field tiles.

Figure 12:
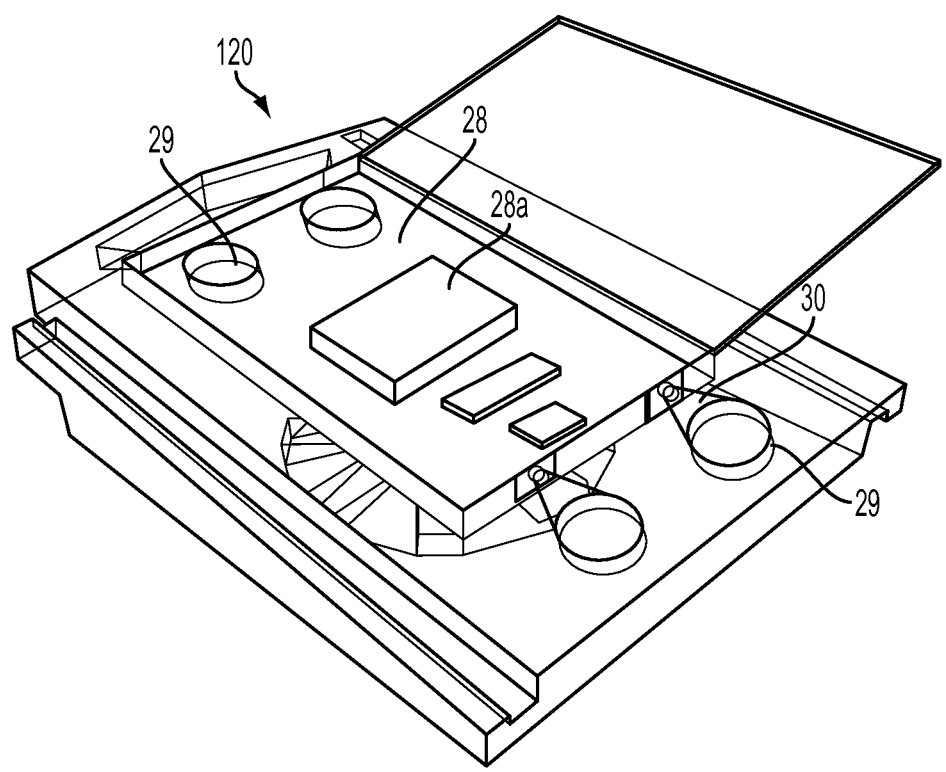
FIG. 12 shows a top perspective view of a hollow tile container or Junction-Box Tile (JT) in the present invention.

Tile 120 in FIG. 12 shows a hollow tile container or tile which is used as a Junction-Box Tile (JT) 120 and installed between several tri-solar tiles (FIG. 2) where the hollow area 28 can be used for receiving circuitry apparatus 28a and management. The tile 120 is designed to blend in with roof product type styles/lines and will provide protective, air cooled, vented, housing for ports 29, internal wiring blocks, mounts for incorporating extemporaneous devices to facilitate safe maintenance. Additional arrays of management capabilities are installed in JT 120-over-JT 120 in a bricklike fashion so to allow electrical connections to flow from JT 120-to-JT 120 through aligned passageways 30 located at the top-face and hollowed area that with sleeve-like attachment create a vertical throughway so a single point of entry for the electrical wiring into the attic space at the roof's peak, before installing the hip-and-ridge tile FIG. 8. Roofers will easily match color-coded plugs and twist couplers on wire harnesses together where they safely await a qualified electrical contractor who will interface the system once he/she sets "Modules" 140 in FIG. 14 in place on site into the tri-solar tile 20 FIG. 2.

Figure 13:
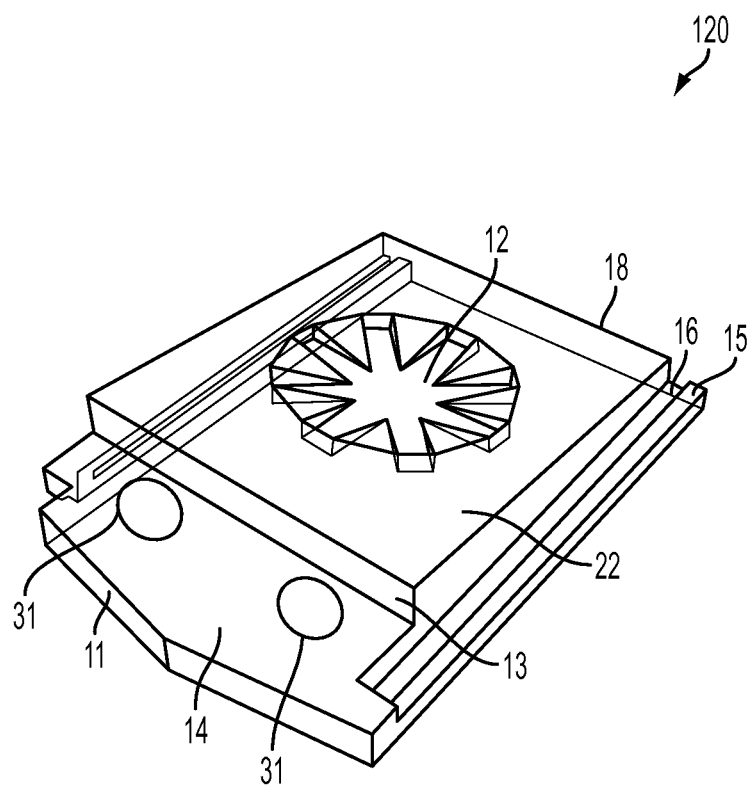
FIG. 13 shows a bottom perspective view of a hollow tile container or Junction-Box Tile (JT) in the present invention.

Tile 120 shown in FIG. 13 shows underside of the hollow tile container or Junction-Box Tile (JT) 120 revealing the plugs 31 covering the aligned passageways 30 and the same dome like depression 12 with rectangular groove/deviations expanding outward thereby considerably increasing contact areas that is sufficiently deep to receive foam adhesive (not shown) that is used to firmly attach tiles 10, 20, 40, 60 to a roof substrate. Also shown in FIG. 13 is a lower step-like portion 14 which is used to overlap the tile below the tile shown in FIGS. 1, 2, 4, 6 when a roof is done. Tile 120 shows also having the same reversed portions 15 and 16 plus edge portions 11, 13 and 18.

Figure 14:
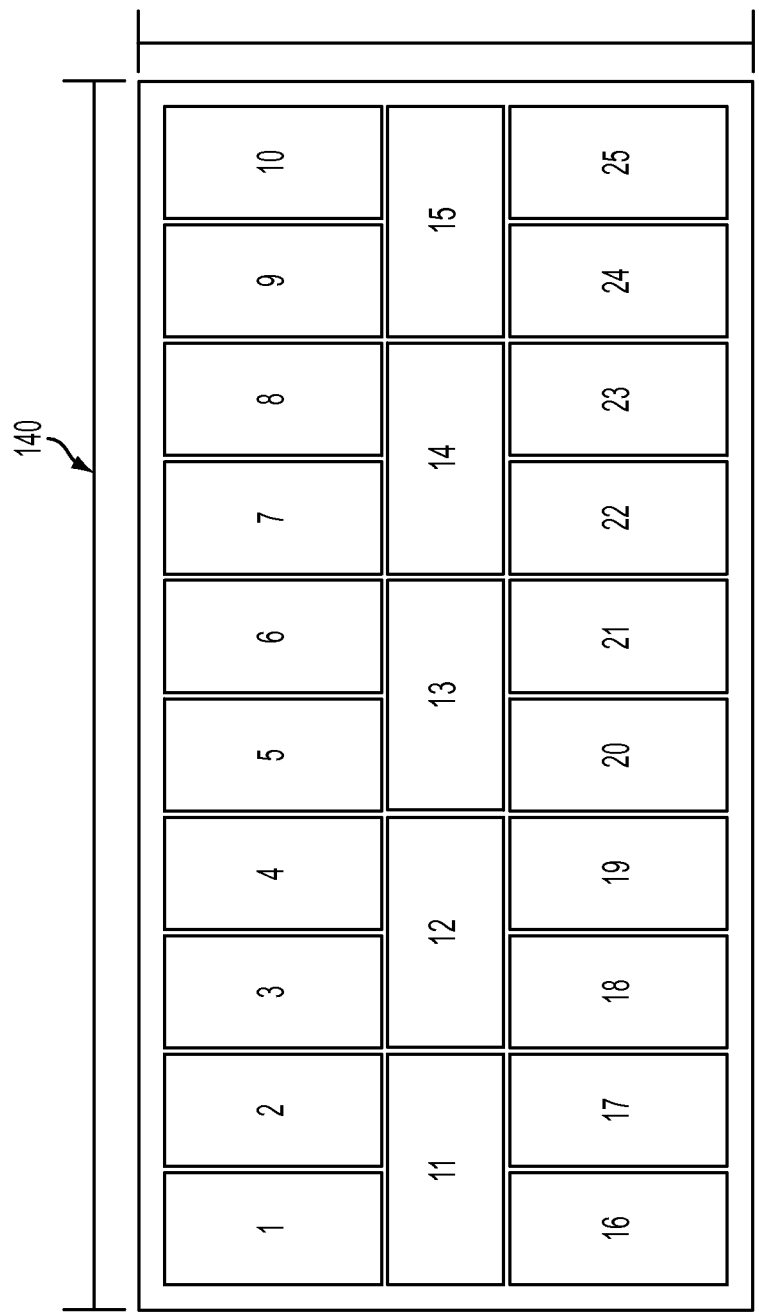
FIG. 14 shows a top perspective view of a solar "Module" used in the present invention.

Solar Module 140 in FIG. 14 shows a grouping of 25 solar cells spaced apart, that can be connected in series or parallel so to produce energy at today's rate of 1 kW per day per every 575-3"×6" solar cells. This solar "Module" 140 in the present invention can be reconfigured or manipulated to house whatever future technology has to offer and set in the tri-solar tile 20 FIG. 2 (in factory or on site) as long as it bears a positive and negative lead plus a ground lead. The solar module 140 fits in the recess 19 in tile 20 in FIG. 2. An entire roof can have tiles 20 with installed modules 140 in the field of the roof.

Figure 15:
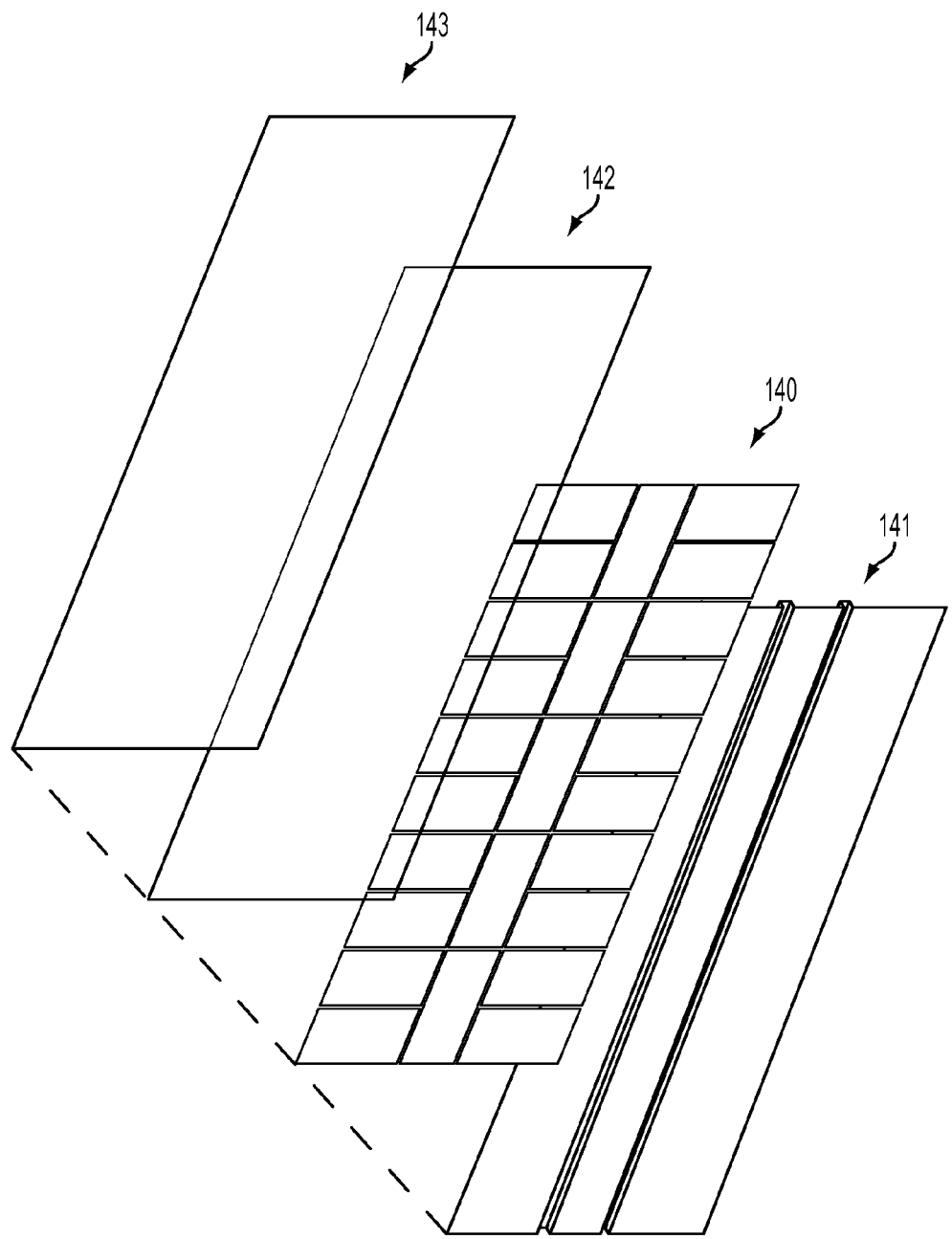
FIG. 15 shows an exploded perspective view of a solar "Module" in the present invention.

FIG. 15 shows an exploded view of the solar "Module" 140 where solar cells can be placed on a base, encapsulated in spray technology or laminated to prevent moisture penetration, and possibly topped-off with protective tempered glass, collectively called the solar "Module" 140, and set in place by the electrician on site into the tri-solar tile 20 FIG. 2 by connecting wire harnesses to "Modules" and then mechanically fasten "Modules" onto tiles and finally to the electrical grid and/or battery bank only after all roof tiles and wire harnesses have been installed by the roofer.

This solar "Module" 150 in the present invention can be reconfigured or manipulated to house whatever future technology has to offer and set in the tri-solar tile 20 FIG. 2 (in factory or on site) as long as the Module includes a positive and negative lead plus a ground lead.

Using the tri-field tile 10 FIG. 1, the tri-solar tile 20 FIG. 2 plus the solar "Module" 140 FIG. 14, the tri-start tile 40 FIG. 4, the single field tile 60 FIG. 6, the hip-and-ridge tile 80 FIG. 8, the rake tile 100 FIG. 10, and the Junction-Box Tile 120 FIG. 12, an entire roof structure with solar integration can be installed quickly and easily using pre-molded tile made of a very light weight material and foam adhesive which allows for quick setup and attachment to the roof structure.

Figure 16:
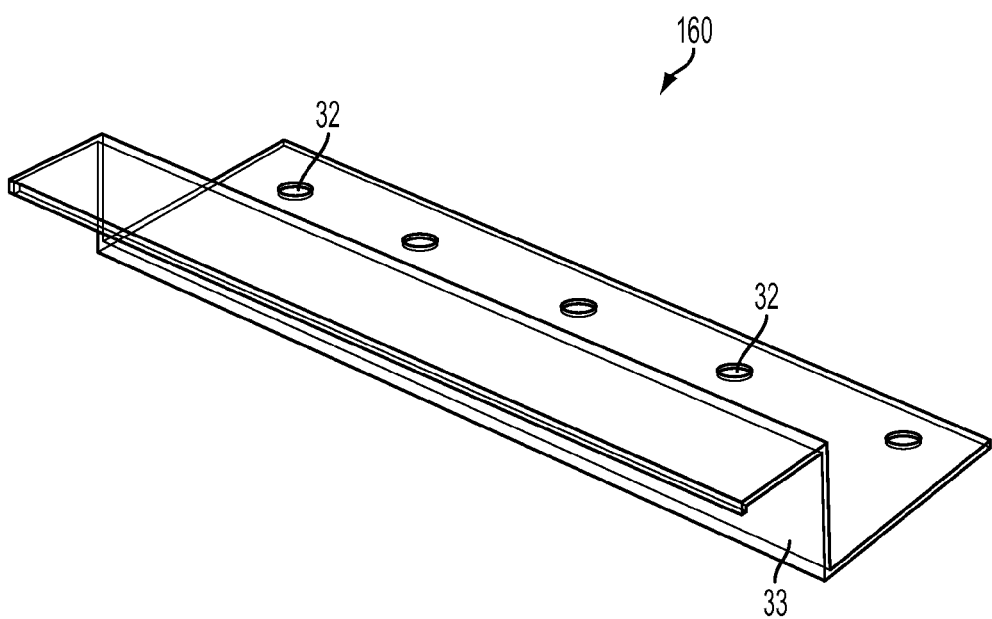
FIG. 16 shows a top perspective view of a "Z" bar tile support used in the present invention.

Tile 160 FIG. 16 shows a "Z" shaped (in cross section) rigid metal track that can be of various lengths of 2 ft or more that are positioned behind the tri-start tile 40 and mechanically fastened to the roof deck using roofing nails through holes 32 that are spaced 4" apart. "Z" tracks 160 are snuggled tight to the top tile end 18 and are positioned between the tile wedged portion 13 against the single field tile 60 or the tri-field tile 10 but never beyond the bottom row or tri-start tile 40. "Z" tracks 160 one fastened create a secure resting point 33 for all vertical remaining invention roof tiles to rest upon above the Z track without the concern for tile slippage resulting from non-curing adhesive foam or downward pressure from upper rows/levels of tiles that also may slip/slide from fresh/non-cured adhesive foam.

The most important feature of the improved polyurethane roof tile disclosed herein is its ability to provide a fire blocking barrier to a roof tile made of a polyurethane foam or other fiberous material that is used on a sloped roof. Applicant has found that using an aliphatic poly material as an outer layer in combination with an intumescent nonhalogenated phosphate inner layer, a fire blocking partition or barrier is formed over the polyurethane foam body of the tile allowing it to be used safely on sloping roofs. Under production, open tile mold cavities initially are robotically sprayed with a flexible byproduct mixture of a 100% solid Aliphatic polyurea material, UltraViolet ray repellents and flame retardant/resistant additives yielding a durable top layer/surface coat that sets to tack in under 1-minute. Secondly an intumescent mixture based on a non-halogenated phosphate yielding a unique 100% solid epoxy sub-layer/beneath surface coat that serves as the fire blocking partition and is also robotically sprayed and allowed to fully cure before closing the mold and injecting the polyurethane foam or mineral fibrous material, permitting all in-mold products to simultaneously bond. An example of the fire blocking partition materials that can be used is described in U.S. Pat. No. 6,773,697 issued May 11, 2004 which is hereby incorporated by reference in its entirety. A specific product that can be used which is sold under the trademark Ceasefire Superior Epoxy is a two component epoxy fire retardant including an intumescent coating based on non-halogenated phosphate technology. This product is sold by New Line Safety LLC and has a DNC certificate number F-16685. Once the tile is removed from the mold, it is ready to be delivered and installed on any 3" on 12" or greater slope roof. The tile can also be correctly manufactured if the process were in reverse.

Figure 17:
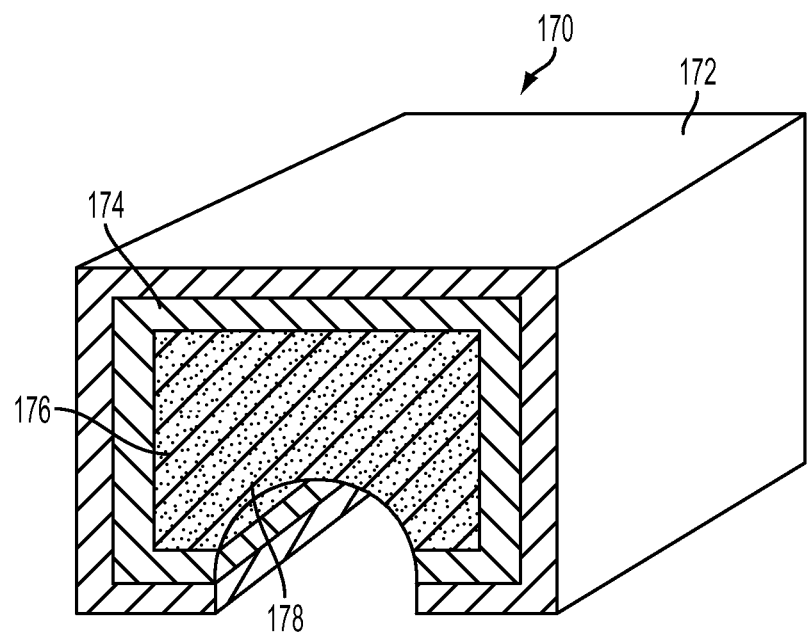
FIG. 17 shows a perspective view in cross-section of the foam tile body and fire retardant inner and outer layers.

FIG. 17 shows a tile 170 that includes an aliphatic outer layer 172 that may include ultraviolet ray protective materials and fire retardants and an inner layer 174 made of an intumescent mixture based on a non-halogenated phosphate. The inner layer 174 is coated on or attached during molding to the polyurethane foam tile body 176 which includes a bottom recessed portion 178 that does not have the inner or outer layer of fire retardant materials affixed thereto. The layers of the invention are shown with the outer/surface layer 172 are applied at 20-mills, the inner/sub-layer 174 applied at 20-mills, and the embodiment of the tile 176 at an average thickness of 2.25-inches for handing and application durability.

Figure 18:
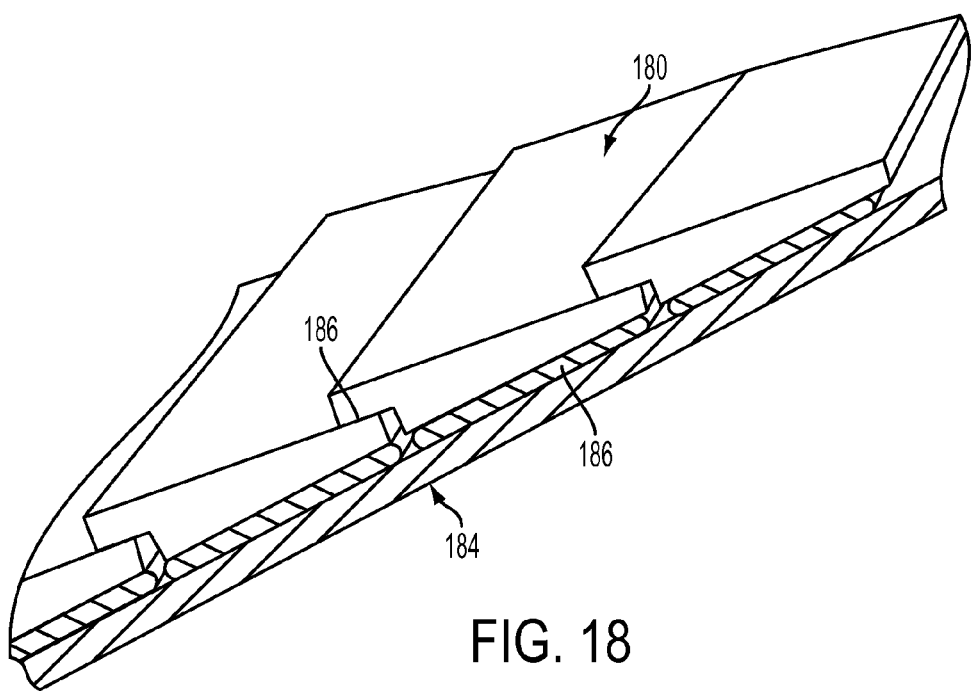
FIG. 18 shows a perspective view of an array of tiles on a sloping roof in accordance with the invention.

FIG. 18 shows the array of roof tiles 180 overlapped with additional adhesive 186 being used to attach an overlapping tiles to the tile below it. Additional adhesive 186 is shown that attaches the roof tiles 182 a roof substrate 190. In FIG. 19A schematically shows an array of overlapped roof tiles 196 that represent field tiles described in the invention herein that are adhesively attached to decking 191 that also includes felt paper 192 and a granular substrate 194, all of which is attached to the decking 191. The array of tiles are attached to the granular substrate by adhesive foam. This view is a section of the roof from the lower edge of the roof to the peak of the roof. The adhesive foam to attach tiles 196 which are overlapped has been explained above. As shown, a drip edge 193 is included at the lower edge of the roof along with the start tile 195 that begins at the bottom of the roof. A ridge tile 197 is also placed at the very top or peak of the roof which is also attached by adhesive foam 199 as more clearly shown in FIG. 19 D. FIG. 19 B shows an enlarged view of the start tile 195 and the drip edge 193 as it is attached to the decking 191 at the very bottom edge of the roof. FIG. 19 C which shows an enlarged view of a midportion of the roof with field tile 196 also includes a Z-track fastener 198 which is attached to support a column of field tiles 196 from moving downwardly and also attaches the start tile. FIG. 19 D shows the ridge tile 197 attached by adhesive foam 199 to the granular substrate 194 covering the peak of the roof. Again felt paper is used 192 that's attached to the decking 191.

Traditional tile roof systems need frequent maintenance and leak after a short service time. The invention solves this problem in several ways as described above.

The instant invention has been shown and described herein in what is considered to be the most practical and preferred embodiment. It is recognized, however, that departures may be made there from within the scope of the invention and that obvious modifications will occur to a person skilled in the art.

What I claim is:

1. A roof tile comprising;
    a tile body in the shape of a six-sided polyhedron, each side being mostly rectangular, said tile body constructed of polyurethane foam; said tile body sides including a top surface, a bottom surface, a front surface, a rear surface, and first and second parallel side surfaces;
    said tile body having an outer layer of a fire resistant, 100% solid aliphatic polyurea UV protective material on said top, front, parallel sides and back surface, and a portion of said bottom surface;
    said tile body having a fire blocking inner layer of an intumescent mixture of a non-halo-generated phosphate affixed beneath said outer layer of fire resistant, aliphatic polyurea UV protective material and to said bottom surface to form a fire blocking barrier;
    said roof tile bottom surface having a flat area configured to contact a roof substrate, said tile body bottom surface including a recessed area of a predetermined dome shape that includes poly foam adhesive receiving grooves/channels that increase adhesive contact area, and said tile body bottom surface recessed area not having an outer layer of fire resistant 100% solid aliphatic polyurea ultra-violet material and not having an inner layer of fire blocking material thereby exposing the foam polyurethane composition, within the dome shaped recess area of the roof tile for engagement with a standardized poly foam adhesive to be used to attach the roof tile to a acceptable roof substrate.

2. The roof tile as in claim 1, wherein: the length of said tile is approximately 3 times longer than a standard sized roof tile of 12 inches wide.

3. The roof tile as in claim 1, including a gel coat layer.

4. The roof tile as in claim 1 including: said roof tile having a substantial top surface that includes an upper recessed area sized in length, width, and depth configured to receive a removable and upgradable solar "module" attachable to the top surface of said roof tile and having solar photovoltaic cells for generating electricity, to fit in the recessed area of the top surface of said roof tile.

5. A roof tile as in claim 1, comprising:
    at least one specialized roof tile configured to include solar cell electrical junction components for regulating an array of power/electricity generating cells.

6. A light-weight roof tile usable with an array of identical tiles to cover the exterior roof substrate of a building comprising:
    a roof tile body shaped to form a polyhedron constructed from a closed cell lightweight polyurethane foam in a predetermined shape that includes a top surface, a bottom surface, a front surface, a back surface, and first and second parallel side surfaces;
    a foam adhesive applied to said bottom surface of said roof tile body for permanently attaching said roof tile body to an exterior roof substrate of a building;
    said roof tile body bottom surface including a flat surface portion for contact with a building exterior roof substrate and a recessed area portion for receiving said foam adhesive, said roof tile bottom recessed area having a predetermined shape and size to increase the effective foam adhesive attachment area by at least 20% of the roof tile flat bottom surface area that receives foam adhesive increasing the attachment strength of said roof tile body to an exterior roof substrate;
    an outer fire resistant aliphatic material layer; and
    an inner fire blocking layer made of a 100% solid intumescent mixture that includes non-halogenated phosphate attached to said outer layer fire resistant layer and said top surface, said portions of bottom surface, said front surface, said back surface and said first and second parallel side surfaces of said polyurethane foam tile body.

7. A roof tile as in claim 6, wherein:
    said roof tile bottom surface recessed area is centrally located relative to the roof tile bottom surface and the roof tile front rear and side surfaces.

8. A roof tile as in claim 6, including:
    said roof tile body including a fire resistant 100% solid aliphatic polyurea ultra-violet (U.V.) layer of material on said top surface, said front and back surfaces, and said first and second side surfaces, and the flat area of said bottom surface.

9. A roof tile as in claim 6, including:
    a fire blocking layer of material positioned on said roof tile body beneath said roof tile body fire resistant U.V. layer of material, said roof tile body bottom surface recessed area not having any fire resistant or fire blocking layers thereupon to enhance the attachment properties of said foam adhesive to the recessed area in said roof tile bottoms surface.

10. A roof tile as in claim 6, wherein:
    said roof tile body is constructed from 3 lb and denser different foam components for light weight and strength and thermal insulation properties.

11. A roof tile as in claim 6 wherein:
    Said roof tile body is constructed from polymeric isocyanate and water-based HCFC-2455.

* * * * *